(12) United States Patent
Lee (10) Patent No.: US 9,473,435 B2
(45) Date of Patent: Oct. 18, 2016

(54) METHOD AND SYSTEM FOR SENDING E-MAIL ATTACHED WITH LARGE FILE ON MOBILE DEVICE

(71) Applicant: NAVER Corporation, Seongnam-Si, Gyeonggi-Do (KR)

(72) Inventor: Chung-Woo Lee, Seongnam-si (KR)

(73) Assignee: Naver Corporation, Gyeonggi-do (KR)

( * ) Notice: Subject to any disclaimer, the term of this patent is extended or adjusted under 35 U.S.C. 154(b) by 237 days.

(21) Appl. No.: 14/098,930

(22) Filed: Dec. 6, 2013

(65) Prior Publication Data

US 2014/0214984 A1 Jul. 31, 2014

(30) Foreign Application Priority Data

Jan. 31, 2013 (KR) .................. 10-2013-0010993

(51) Int. Cl.
*G06F 15/16* (2006.01)
*H04L 12/58* (2006.01)

(52) U.S. Cl.
CPC ............. *H04L 51/08* (2013.01); *H04L 51/063* (2013.01)

(58) Field of Classification Search
CPC .............................. H04L 51/08; H04L 51/063
USPC .......................................................... 709/206
See application file for complete search history.

(56) References Cited

U.S. PATENT DOCUMENTS

| | | | | | |
|---|---|---|---|---|---|
| 5,771,355 | A * | 6/1998 | Kuzma | ................ | G06Q 10/107 709/226 |
| 5,781,901 | A * | 7/1998 | Kuzma | ................ | G06Q 10/107 709/206 |
| 5,903,723 | A * | 5/1999 | Beck | ..................... | G06F 17/22 707/999.01 |
| 8,126,966 | B2 * | 2/2012 | Dote | ..................... | H04L 12/585 709/204 |
| 8,260,861 | B1 * | 9/2012 | Bruno | ..................... | H04L 51/08 709/206 |
| 2006/0031309 | A1 * | 2/2006 | Luoffo | ................ | G06Q 10/107 709/206 |
| 2006/0069744 | A1 * | 3/2006 | Alberti | ................ | H04L 51/063 709/217 |
| 2006/0195526 | A1 * | 8/2006 | Lederer | ................ | G06Q 10/107 709/206 |
| 2007/0100978 | A1 * | 5/2007 | Levi | ................... | H04L 12/5855 709/223 |
| 2007/0143419 | A1 * | 6/2007 | Plas | ..................... | G06Q 10/107 709/206 |
| 2008/0281924 | A1 * | 11/2008 | Gadwale | ................ | H04L 12/58 709/206 |
| 2012/0233227 | A1 * | 9/2012 | Alexander | ........ | G06F 17/30091 707/827 |
| 2012/0278405 | A1 * | 11/2012 | Costenaro | ............. | H04L 51/08 709/206 |
| 2012/0278407 | A1 * | 11/2012 | Meisels | ................. | H04L 51/08 709/206 |
| 2013/0226979 | A1 * | 8/2013 | Caruso | .................. | H04L 65/605 707/827 |
| 2013/0268600 | A1 * | 10/2013 | Chacko | ................. | H04L 51/066 709/206 |
| 2014/0122620 | A1 * | 5/2014 | Lin | ..................... | G06Q 10/107 709/206 |

FOREIGN PATENT DOCUMENTS

| | | |
|---|---|---|
| KR | 2003-0011019 A | 2/2003 |
| KR | 2004-0083398 A | 10/2004 |
| KR | 10-1035302 B1 | 5/2011 |

OTHER PUBLICATIONS

"Cloud services are useful when you want to share big size pictures or the PPT material.", Daum Blog, Jul. 22, 2011, <URL : http://changeon.org/19658>.
Korean Office Action dated Aug. 29, 2014 in corresponding Korean Application No. 10-2013-0010993.

* cited by examiner

*Primary Examiner* — Wing F Chan
*Assistant Examiner* — Joseph Maniwang
(74) *Attorney, Agent, or Firm* — Harness, Dickey & Pierce, P.L.C.

(57) ABSTRACT

Systems and methods for transmitting an e-mail having an attached file are provided. The system includes a mail server configured to receive the e-mail including the attached file, store the attached file at a storage location in a cloud storage system, and replace the attached file with location information. The location information may indicate the storage location. The system includes the cloud storage system configured to store the attached file at the storage location. The mail server may be further configured to send the e-mail with the location information and without the attached file.

20 Claims, 3 Drawing Sheets

METHOD AND SYSTEM FOR SENDING E-MAIL ATTACHED WITH LARGE FILE ON MOBILE DEVICE

CROSS-REFERENCE TO RELATED APPLICATION

This application claims priority from and the benefit of Korean Patent Application No. 10-2013-0010993, filed on Jan. 31, 2013, which is hereby incorporated by reference for all purposes as if fully set forth herein in its entirety.

BACKGROUND

1. Field

Example embodiments relate to a method and system for sending an e-mail attached with a large file on a mobile device.

2. Description of the Background

Using a wireless Internet supporting function, currently released cellular phones ("smart phones"), tablet personal computers (PCs), and the like, may connect to the Internet and/or other computer devices to perform a variety of functions, such as e-mailing, web browsing, faxing, navigation, and playing a game, and the like.

Figure 1:
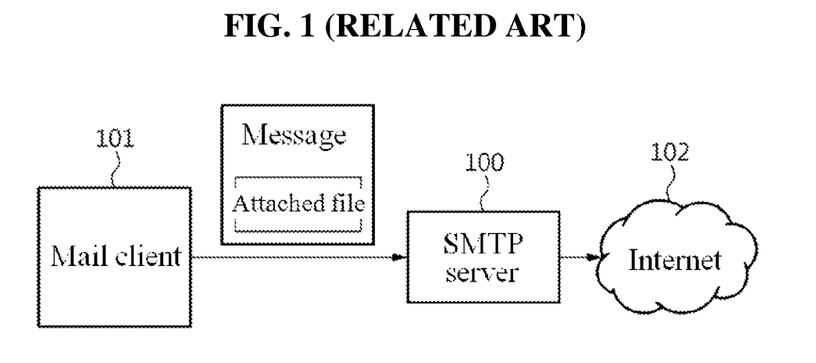
FIG. 1 illustrates a mail sending procedure according to a general standard simple mail transfer protocol (SMTP).

A procedure of sending an e-mail using a standard communication protocol, such as a simple mail transfer protocol (SMTP) will be described with reference to FIG. 1.

A sender may create contents of an e-mail on a terminal 101 in which a mail client is installed, may designate a file to be attached to the e-mail, and may request sending of the e-mail attached with the file.

In this example, the mail client installed in the terminal 101 of the sender may send, to an SMTP server 100, the contents of the e-mail created by the sender. In addition, the mail client may upload the designated attached file to the SMTP server 100.

The SMTP server 100 may send the e-mail including the attached file to a mail server of a corresponding service through the Internet 102 and/or other like network in order to transfer the contents of the e-mail created by the sender to a receiver together with the attached file.

With the development of relatively sophisticated computer devices, the high-speed Internet, relatively high-level multimedia equipment, and the like, a data processing rate and a communication rate (e.g., bitrate) are rapidly being accelerated and at the same time, an amount of data handled by users is also significantly increasing. Due to such increase in an amount of data, data processing, and high bitrates, an amount of contents attached to an e-mail on a smartphone is also increasing, such as pictures or moving pictures, for example.

However, a standard mail server is limiting by the capacity of an individual e-mail to relatively small amounts of data, for example, 10 megabytes (MB).

Accordingly, Korean Laid-Open Publication No. 10-2004-0083396, published on Oct. 1, 2004, discloses a technique of using a home storage as a storage space for receiving a large file in association with a large capacity of a file being sent and received through an e-mail on a web.

Figure 2:
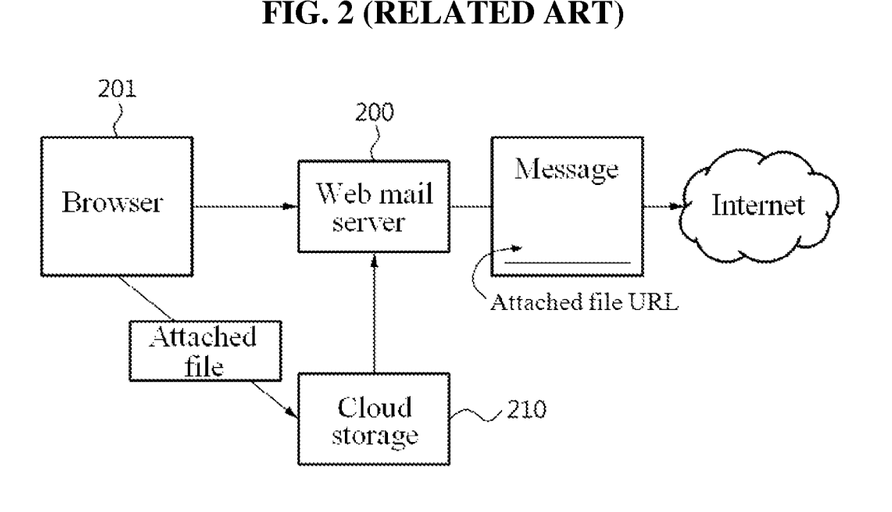
FIG. 2 illustrates a procedure of sending an e-mail attached with a large file on a web mail.

Also, referring to FIG. 2, in a case in which a sender creates an e-mail through a browser 201 connected to a web mail server 200, a web mail service follows a method in which the browser 201 may directly upload, to a separate cloud storage 210, a large attached file designated by the sender and the web mail server 200 may include, in contents of the e-mail, a universal resource locator (URL) of the corresponding attached file stored in the cloud storage 210 and thereby send the e-mail to a receiver.

However, in a mobile environment of using a standard SMTP, such as a smartphone, a mail client may not directly use a cloud storage for attaching a large file of an individual mail service. Accordingly, the method of FIG. 2 may not be applied and an e-mail may be sent within a limited capacity.

SUMMARY

According to at least one example embodiment, a method and system for sending an e-mail attached with a large file on a mobile device is provided.

According to an example embodiment, a system for transmitting an e-mail having an attached file is provided. The system includes a mail server configured to receive the e-mail including the attached file, store the attached file at a storage location in a cloud storage system, and replace the attached file with location information. The location information indicating the storage location. The system includes the cloud storage system configured to store the attached file at the storage location.

Example embodiments provide that the mail server is further configured to send the e-mail with the location information and without the attached file.

Example embodiments provide that the mail server includes a processor configured to execute a file controller to separate the attached file from the e-mail and to store the separated attached file in the cloud storage system. The processor is configured to execute a mail sender to send the e-mail with the location information.

Example embodiments provide that the mail server is configured to determine that a size of the attached file is greater than a desired size limit, and replace the attached file with location information when the size of the attached file is determined to be greater than the desired size limit.

Example embodiments provide that the storage location includes a uniform resource locator (URL) and the location information is a link to the URL of the storage location.

Example embodiments provide that the mail server sends the e-mail received from the mobile device according to one of a simple mail transfer protocol (SMTP) and an extended SMTP (ESTMP).

Example embodiments provide that the mail server is further configured to resume a transmission of data if the transmission is interrupted, the resuming taking place where at a point where the transmission was interrupted.

According to an example embodiment, a mobile device for sending an e-mail with an attached file is provided. The mobile device includes a processor configured to execute a mail client to attach a desired file to an e-mail, and send the e-mail to a mail server. The attached file may be separated from the e-mail and may be stored in a cloud storage system at a storage location. The attached file may be replaced with location information indicating the storage location.

Example embodiments provide that the attached file is replaced with the location information when a size of the attached file is determined to be greater than a desired size limit.

According to an example embodiment, a method of sending an e-mail with an attached file is provided. The method includes receiving an e-mail sent from a mail client installed in a mobile device. The e-mail includes the attached file. The method includes storing the attached file in a cloud storage system. The method includes replacing the attached file with location information. The location information may indicate a storage location of the attached file in the cloud storage system.

Example embodiments provide that the method further includes sending the e-mail with the location information and without the attached file.

Example embodiments provide that the replacing includes determining that a size of the attached file is greater than a desired size limit, and replacing the attached file with location information when the size of the attached file is determined to be greater than the desired size limit.

Example embodiments provide that the e-mail is sent according to one of a simple mail transfer protocol (SMTP) and an extended SMTP (ESMTP).

Example embodiments provide that the sending is interrupted, and the method further includes resuming the sending from a point at which the sending is interrupted.

According to an example embodiment, a non-transitory computer-readable recording medium is provided that stores program code that, when executed by a processor, performs a function of receiving an e-mail sent from a mail client installed in a mobile device, the e-mail including an attached file, storing the attached file in a cloud storage system, and replacing the attached file with location information, the location information indicating a storage location of the attached file in the cloud storage system.

According to an example embodiment, a mail server for transmitting an e-mail having an attached file is provided. The mail server is configured to receive an e-mail including the attached file, store the attached file at a storage location in a cloud storage system, and replace the attached file with location information, the location information indicating the storage location.

Example embodiments provide that the mail server is further configured to send the e-mail with the location information and without the attached file.

Example embodiments provide that the mail server is further configured to determine that a size of the attached file is greater than a desired size limit, and replace the attached file with location information when the size of the attached file is determined to be greater than the desired size limit.

Example embodiments provide that the mail server is further configured to resume a transmission of data if the transmission is interrupted, the resuming taking place where at a point where the transmission was interrupted.

Example embodiments provide that the storage location includes a uniform resource locator (URL) and the location information is a link to the URL of the storage location.

It is to be understood that both the foregoing general description and the following detailed description are explanatory and are intended to provide further explanation of the example embodiments as claimed.

BRIEF DESCRIPTION OF THE DRAWINGS

The accompanying drawings, which are included to provide a further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

Example embodiments provide methods and systems for sending an e-mail attached with a large file using a mobile device according to a standard protocol, such as a simple mail transfer protocol (SMTP), extended SMTP (ESTMP), and the like, which is used to send e-mails on the Internet and/or other like computer network. According to example embodiments, a method of sending an e-mail by separating a large file attached to the e-mail at a sending point in time according to SMTP, may be done by storing the separated attached file in a cloud storage, and by replacing the large attached file with a corresponding universal resource locator (URL), which allows a standard mail server to perform a sending procedure while decreasing an actual data capacity of the e-mail.

Also, according to example embodiments, an SMTP mail client unaware of a cloud storage or having difficulty in using the cloud storage may attach a large file, and thus, a service for sending an e-mail attached with a large file in a mobile environment may be provided.

An existing mail sending procedure according to a standard SMTP may be modified and thereby be applied to a mail sending method and system according to example embodiments. Accordingly, when sending an e-mail attached with a large file on a mobile device according to the standard SMTP, an SMTP server may employ a method of sending an e-mail by separating a large file attached to the e-mail, by storing the separated attached file in a separate cloud storage, and by replacing the large attached file with a corresponding universal resource locator (URL), instead of processing a corresponding procedure as its exceeding capacity.

The term "mobile device" used throughout the present specification may refer to a mobile terminal and may include any hardware computing device having portability or mobility, such as a smart phone, a laptop computer, a digital broadcasting terminal, an MP3 player, a tablet PC, a portable medial player (PMP), navigation device, and/or any logical device capable of capturing/recording, storing, and/or transferring data via a communications network. According to various embodiments, "mobile devices", as used herein, may be any hardware computing device capable of communicating with a server (e.g., SMTP server 300) and/or other like network element, such that the mobile device is able to receive services from the server. Mobile devices may include memory, one or more processors, and transceiver. Mobile devices may be configured to send/receive data to/from network devices, such as a router, switch, or other like network devices, via a wired or wireless connection. Mobile devices may be designed to sequentially and automatically carry out a sequence of arithmetic or logical operations; equipped to record/store digital data on a machine readable medium; and transmit and receive digital data via one or more network devices. Mobile devices may include a wireless transceiver configured to operate in accordance with wireless communications standard.

The term "e-mail attached with a large file" may refer to an e-mail attached with a file exceeding a capacity limited by a standard mail server. For example, in a case where a standard e-mail server is limited to 10 megabytes (MBs), an e-mail having an attached with a file exceeding 10 MBs, may be classified as an e-mail attached with a large file.

The term "cloud storage" may refer to a networked data storage device where data is stored in virtual and/or logical databases, such that the physical hardware devices used to store data may utilize multiple network elements, servers, and/or other like devices, and that span across multiple locations. Cloud storage used herein may refer to a data storage space on a network device that is used for providing a file storage function in a mail service, and may indicate a storage for attaching a large file according to example embodiments.

Figure 3:
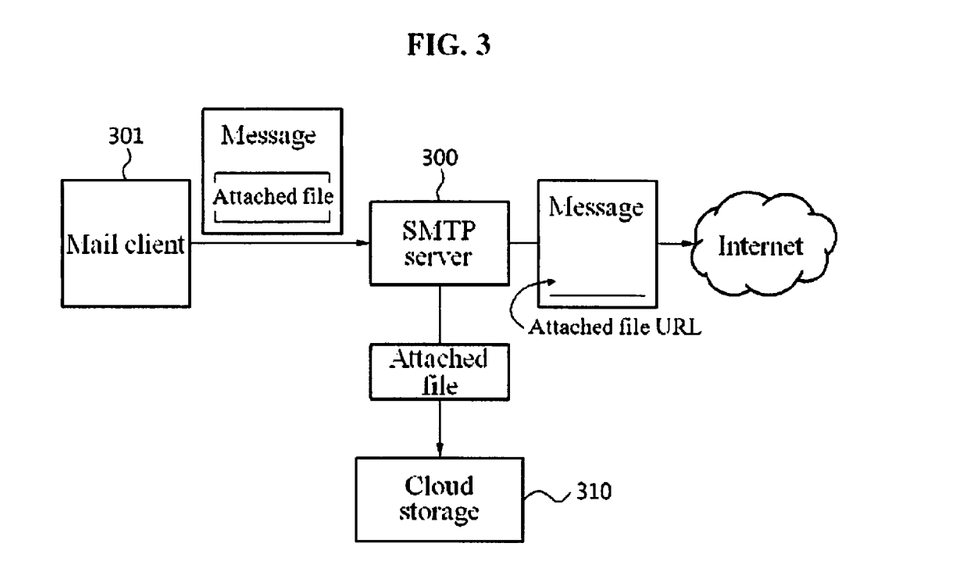
FIG. 3 illustrates a procedure of sending an e-mail attached with a large file on a mobile device using a standard SMTP according to example embodiments.

FIG. 3 illustrates a procedure of sending an e-mail attached with a large file on a mobile device using a standard SMTP according to example embodiments.

Referring to FIG. 3, a sender may create an e-mail text through a mail client 301 installed in the mobile device and may designate a file to be attached to the e-mail. Here, the designated file to be attached may be a large file exceeding a limited capacity as defined by an e-mail message service.

The mail client 301 may transfer the e-mail attached with the large file to an SMTP server 300 in a message form according to the standard SMTP. In response thereto, the SMTP server 300 may separate the large file attached to the e-mail text, may store the separated large file in a cloud storage 310, may replace the large attached file with a corresponding URL, and thereby send the e-mail.

Figure 4:
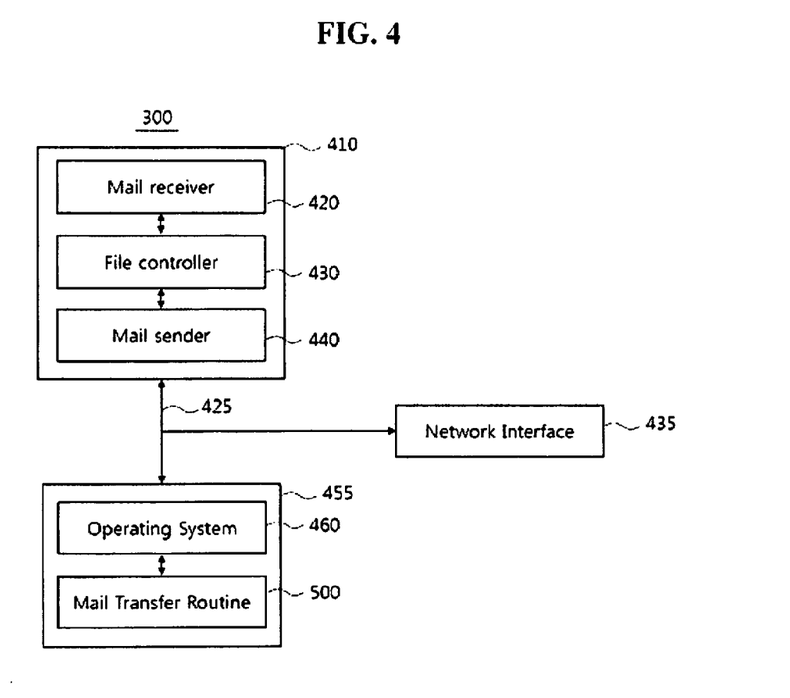
FIG. 4 is a block diagram illustrating a configuration of a system for sending an e-mail attached with a large file on a mobile device using a standard SMTP according to example embodiments.

FIG. 4 is a block diagram illustrating a configuration of a system for sending an e-mail attached with a large file on a mobile device using a standard SMTP according to example embodiments.

Referring to FIG. 4, the system for sending an e-mail attached with a large file may refer to an SMTP server 300 that is a mail sending server. As shown, SMTP server 300 includes central processing unit 410, bus 425, network interface 435, and memory 455. During operation, memory 455 includes operating system 460 and mail transfer routine 500; and processor 410 includes mail receiver 420, a file controller 430, and a mail sender 440. In some embodiments, SMTP server 300 may include many more components than those shown in FIG. 4. However, it is not necessary that all of these generally conventional components be shown in order to disclose the illustrative embodiment. For example, SMTP server 300 may also include a display, a transceiver, and/or other like components.

Memory 455 may be a computer readable storage medium that generally includes a random access memory (RAM), read only memory (ROM), and a permanent mass storage device, such as a disk drive. Memory 455 also stores operating system 460 and program code for mail transfer routine 500. These software components may also be loaded from a separate computer readable storage medium into memory 455 using a drive mechanism (not shown). Such separate computer readable storage medium may include a floppy drive, disc, tape, DVD/CD-ROM drive, memory card, or other like computer readable storage medium (not shown). In some embodiments, software components may be loaded into memory 455 via network interface 435, rather than via a computer readable storage medium.

Bus 425 enables the communication and data transfer between the components of SMTP server 300. Bus 425 may comprise a high-speed serial bus, parallel bus, storage area network (SAN), and/or other suitable communication technology.

Network interface 435 is a computer hardware component that connects SMTP server 300 to a computer network (e.g., network 105). Network interface 435 may connect SMTP server 300 to a computer network via a wired or wireless connection Processor 410 may be configured to carry out instructions of a computer program by performing the basic arithmetical, logical, and input/output operations of the system. Instructions may be provided to processor 410 by memory 455 via bus 425, or by network interface 435 via bus 425. Processor 410 is configured to execute program code for mail receiver 420, a file controller 430, and a mail sender 440. Such program code may be stored in a storage device (e.g., memory 455).

The mail receiver 420 may receive, from a mail client installed in a mobile device, an e-mail attached with a large file, which is created by a sender.

The file controller 430 may separate the large file attached to the e-mail, and may store the large attached file in a cloud storage (e.g., cloud storage 310).

The mail sender 440 may send the e-mail by replacing the large attached file with URL information stored in the cloud storage in a text of the e-mail. For example, the mail sender 440 may send the e-mail attached with URL information stored in the cloud storage 310 instead of sending the large attached file.

According to the above configuration, to send an e-mail attached with a large file on a mobile device according to a standard SMTP, a mail transfer communication protocol may be modified so that the SMTP server 300 may send the e-mail by separating the large file attached to the e-mail, storing the separated large attached file in a separate storage space, and replacing the separated large attached file with a corresponding URL.

According to example embodiments, a method of sending an e-mail by separating a large file attached to the e-mail at a sending point in time according to a SMTP, by storing the separated attached file in a cloud storage, and by replacing the large attached file with a corresponding URL is applied, and thus, a standard mail server may perform a sending procedure while decreasing an data capacity of the e-mail. In addition, even though a mail client installed in the mobile device according to the standard SMTP is unaware of the cloud storage or has difficulty in using the cloud storage, the large file may be attached and sent to a recipient.

According to example embodiments, a data transmission may be suspended due to a variety of reasons, such as a network disconnection, crosstalk, a system malfunction, and/or other like issues. In such instances, an e-mail attached with a large file that is being sent from a mobile device to a mail server or while the large attached file is being sent from the mail server to a cloud storage, a resuming function that includes resuming a transmission of data from a part at which the transmission is suspended may be provided instead of requiring a user to resend the email with the attached data.

According to example embodiments, at least one resuming techniques among a variety of known techniques, such as a technique that enables a data sender side to resume a transmission of data by verifying a connection state with a data receiver side and a technique that enables a data receiver side to perform a resuming function by verifying a connection state with a data sender state, may be employed.

Figure 5:
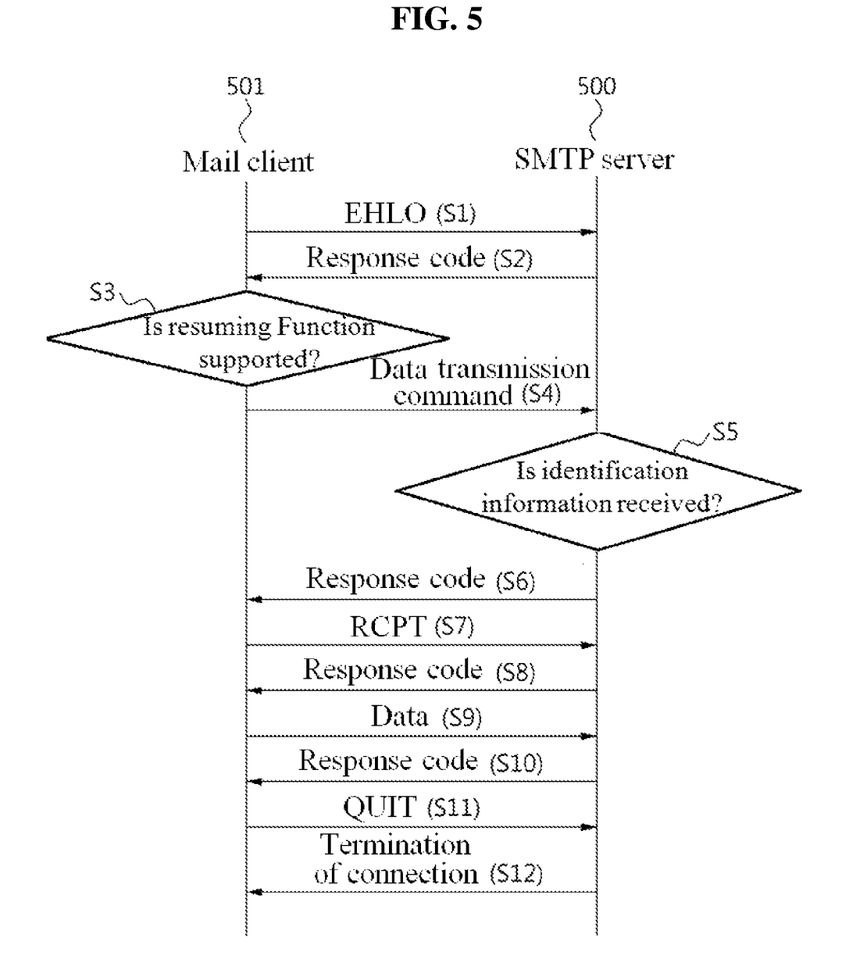
FIG. 5 is a flowchart illustrating a message transmission routine for resuming a transmission of an e-mail attached with a large file according to example embodiments.

FIG. 5 is a flowchart illustrating a message transfer routine 500 for resuming a transmission of an e-mail attached with a large file according to example embodiments. For example, a method that enables a mobile device to resume a suspended transmission of data by verifying a connection state with an SMTP server 300 will be described with reference to FIG. 5.

Referring to FIG. 5, as shown in operation S1, when a mail client 501 installed in the mobile device succeeds in a connection to the SMTP server 300, the mail client 501 may transmit a hello command and/or an extended hello (EHLO) command to the SMTP server 300. In response to the EHLO command, as shown in operation S2, the SMTP server 300 may transmit, to the mail client 501, a response code including information indicating whether a resuming function is supported. Here, the resuming function is indicated with "check point".

As shown in operation S3, the mail client 501 determines if the SMTP server 300 supports a resuming function. When the SMTP server 300 supports the resuming function, the mail client 501 having received the response code may send a data transmission command, as shown in operation S4. The data transmission command may include identification information of data desired to be transmitted to the SMTP server 300 in a transmission identification information section (TRANSID) of a data transmission command, and may transmit the data transmission command to the SMTP server 300.

In response to the data transmission command, as shown in operation S5, the SMTP server 300 determines if the identification information has been received. If the identification information is received, the SMTP server 300 may store the identification information included in the transmission identification information section of the data transmission command, and then as shown in operation S6, the SMTP server 300 transmits a response code to the mail client 501.

As shown in operation S7, the mail client 501 transmits a RCPT command to the SMTP server 300. The RCPT command may be used to establish a recipient of the message being sent by the mail client 501. In response to the RCPT command, as shown in operation S8, the SMTP server 300 transmits a response code to the mail client 501.

As shown in operation S9, the mail client 501 transmits a DATA command to the SMTP server 300. The DATA command may include message text and/or other contents of the message, as well as one or more attached files. The message text may include a header and a body. In various embodiments where one or more attached files exceed a desired data size, a link and/or other like electronic reference may be added, appended, or otherwise included in the message text, which directs a user to the attached documents stored in a cloud storage system.

In response to the DATA command, as shown in operation S10, the SMTP server 300 transmits a response code to the mail client 501. The response code of operation S10 may indicate whether the message was properly delivered or not, a reason why the message was delivered or not, and/or other like information.

As shown in operation S11, the mail client 501 transmits a QUIT command to the SMTP server 300. The QUIT command may indicate that the message transmission is to be ended and/or terminated. In response to the QUIT command, as shown in operation S12, the SMTP server 300 terminates the session.

Operations S7-S12 demonstrate that the mail client 501 and the SMTP server 300 may resume a transmission of data from a part at which the transmission is suspended through a procedure including RCPT, a response, a data transmission, a response, QUIT, and the like (S7 through S12).

As described above, in a case in which sending of an e-mail is suspended due to a variety of reasons, such as a network disconnection, crosstalk, and/or a system malfunction, while the e-mail attached with a large file is being sent, the mail client 501 installed in the mobile device may resume the suspended sending of the e-mail by attempting to access the SMTP server 300 at desired time intervals. In particular, according to example embodiments, by applying the aforementioned resuming technique to the large file attached to the e-mail, uploading from the SMTP server 300 to the cloud storage may be performed.

Therefore, according to example embodiments, an e-mail attached with a large file may be more efficiently sent in a mobile environment by uploading the attached file to the cloud storage.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the example embodiments disclosed herein. Thus, it is intended that the example embodiments cover multiple modifications and variations provided they come within the scope of the appended claims and their equivalents.

What is claimed is:

1. A system for transmitting an e-mail having an attached file, the system comprising:
   at least one mobile device; and
   a simple mail transfer protocol (SMTP) mail server configured to
   receive, from a mobile device, an extended simple mail transfer protocol (ESMTP) command to determine whether the SMTP mail server supports resuming data transmissions at a part at which the data transmissions were suspended,
   transmit, to the mobile device, an ESMTP response indicating whether the SMTP mail server supports the resuming data transmissions at a part at which the data transmissions were suspended,
   receive, from the mobile device, the e-mail including the attached file, determine whether receiving the e-mail including the attached file was suspended, and if the receiving was suspended resume receiving, from the mobile device, the e-mail including the attached file at a specified time interval, transmit the attached file to a cloud storage system for storage at a storage location, replace, in the e-mail, the attached file included with the e-mail with location information, the location information indicating the storage location; and the cloud storage system configured to store the received file transmitted by the SMTP mail server at the storage location.

2. The system of claim 1, wherein the SMTP mail server is further configured to:

send the e-mail with the location information and without the received attached file.

3. The system of claim 2, wherein the SMTP mail server comprises:

a processor configured to execute a file controller to separate the received attached file included with the e-mail from the e-mail and to store the separated attached file in the cloud storage system; and the processor configured to execute a mail sender to send the e-mail with the location information.

4. The system of claim 1, wherein the SMTP mail server is further configured to:

determine that a size of the attached file included with the e-mail is greater than a desired size limit; and replace the attached file included with the e-mail with location information when the size of the attached file is determined to be greater than the desired size limit.

5. The system of claim 1, wherein the storage location includes a uniform resource locator (URL) and the location information is a link to the URL of the storage location.

6. The system of claim 1, wherein the SMTP mail server is configured to send the e-mail received from the mobile device according to one of a SMTP and an ESTMP.

7. The system of claim 1, wherein the SMTP mail server is further configured to:

resume a transmission of data if the transmission is interrupted, the resuming taking place at a point where the transmission was interrupted.

8. A mobile device for sending an e-mail having an attached file, the mobile device comprising:

a memory having computer readable instructions related to a simple mail transfer protocol (SMTP) compatible mail client stored thereon; and at least one processor configured to execute the computer readable instructions to, transmit an extended simple mail transfer protocol (ESMTP) command to determine whether a SMTP mail server supports resuming data transmissions at a part at which the data transmissions were suspended;

receive an ESMTP response indicating whether the SMTP mail server supports the resuming data transmissions at a part at which the data transmission were suspended;

attach a desired file to an e-mail, and send the e-mail including the desired file to the SMTP mail server, the attached file being separated by the SMTP mail server from the e-mail and being stored in a cloud storage system at a storage location, and the separated attached file being replaced in the e-mail with location information indicating the storage location; and determine whether sending the e-mail including the attached file was suspended, and if the receiving was suspended, resume sending the e-mail including the attached file at a specified time interval.

9. The mobile device of claim 8, wherein the attached file received by the SMTP mail server from the mobile device is replaced with the location information when a size of the received attached file is determined to be greater than a desired size limit.

10. A method of sending an e-mail having an attached file, the method comprising:

receiving, by a simple mail transfer protocol (SMTP) mail server, an extended simple mail transfer protocol (ESMTP) command to determine whether the SMTP mail server supports resuming data transmissions at a part at which the data transmissions were suspended, from a mail client installed in a mobile device;

transmitting, to the mail client, an ESTMP response indicating whether the SMTP mail server supports resuming data transmissions at a part at which the data transmissions were suspended;

receiving, by the SMTP mail server, the e-mail sent from the mail client, the e-mail including the attached file;

determining, by the SMTP mail server, whether the receiving the e-mail including the attached file was suspended, and if the receiving was suspended, resuming receiving, from the mobile device, the e-mail including the attached file at a specified time interval, transmitting, by the SMTP mail server, the received attached file to a cloud storage system for storage at a storage location; and replacing in the e-mail, by the SMTP mail server, the attached file included with the e-mail with location information, the location information indicating the storage location of the stored attached file in the cloud storage system.

11. The method of claim 10, further comprising:

sending, by the SMTP mail server, the e-mail with the location information and without the received attached file.

12. The method of claim 10, wherein the replacing comprises:

determining that a size of the received attached file is greater than a desired size limit; and replacing the received attached file with location information when the size of the received attached file is determined to be greater than the desired size limit.

13. The method of claim 10, wherein the sending the e-mail is sent according to one of a SMTP and an ESMTP.

14. The method of claim 11, the method further comprising:

determining if the sending has been interrupted; and resuming the sending from a point at which the sending is interrupted.

15. A non-transitory computer-readable recording medium storing computer readable instructions that, when executed by at least one processor, configures the at least one processor to:

receive, from a mail client installed in a mobile device, an extended simple mail transfer protocol (ESMTP) command to determine whether a simple mail transfer protocol (SMTP) mail server supports resuming data transmissions at a part at which the data transmissions were suspended;

transmit, to the mail client, an ESMTP response indicating whether the SMTP mail server supports the resuming data transmissions at a part at which the data transmissions were suspended;

receive an e-mail sent from the mail client, the e-mail including an attached file;

determine whether receiving the e-mail including the attached file was suspended, and if the receiving was suspended, resume receiving, from the mobile device, the e-mail including the attached file at a specified time interval, transmit the received attached file to a cloud storage system for storage at a storage location; and replace the received attached file with location information, the location information indicating the storage location of the attached file transmitted to the cloud storage system in the cloud storage system.

16. A simple mail transfer protocol (SMTP) mail server for transmitting an e-mail including an attached file, the SMTP mail server comprising:

a memory having computer readable instructions stored thereon; and at least one processor configured to execute the computer readable instructions to, receive, from a mail client, an extended simple mail transfer protocol (ESMTP) command to determine whether the SMTP mail server supports resuming data transmissions at a part at which the data transmissions were suspended;

transmit, to the mail client, an ESMTP response indicating whether the SMTP mail server supports the resuming data transmissions at a part at which the data transmissions were suspended;

receive the e-mail including the attached file;

determine whether the receiving the e-mail including the attached file was suspended, and if the receiving was suspended resume receiving, from the mobile device, the e-mail including the attached file at a specified time interval;

transmit the received attached file to a cloud storage system for storage at a storage location; and replace, in the e-mail, the received attached file with location information, the location information indicating the storage location.

17. The SMTP mail server of claim 16, further configured to:

send the e-mail with the location information and without the received attached file.

18. The SMTP mail server of claim 16, further configured to:

determine that a size of the received attached file is greater than a desired size limit; and replace the received attached file with location information when the size of the received attached file is determined to be greater than the desired size limit.

19. The SMTP mail server of claim 16, further configured to:

determine whether a transmission of data is interrupted;

resume a transmission of data if the transmission is interrupted, the resuming taking place at a point where the transmission was interrupted.

20. The SMTP mail server of claim 16, wherein the storage location includes a uniform resource locator (URL) and the location information is a link to the URL of the storage location.

* * * * *